March 9, 1954  J. A. ORR  2,671,299
DISK TYPE MOWER
Filed Sept. 7, 1951
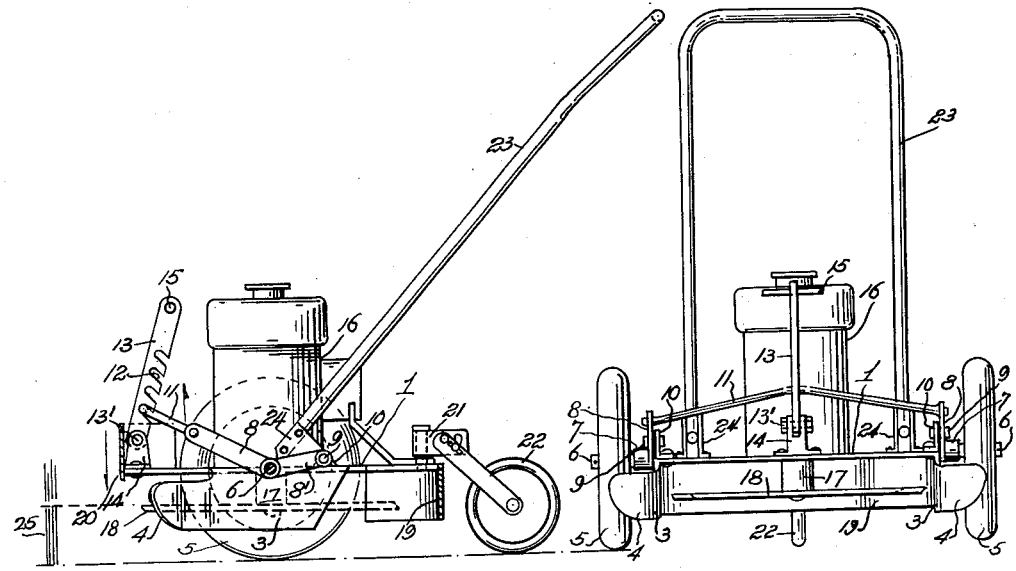
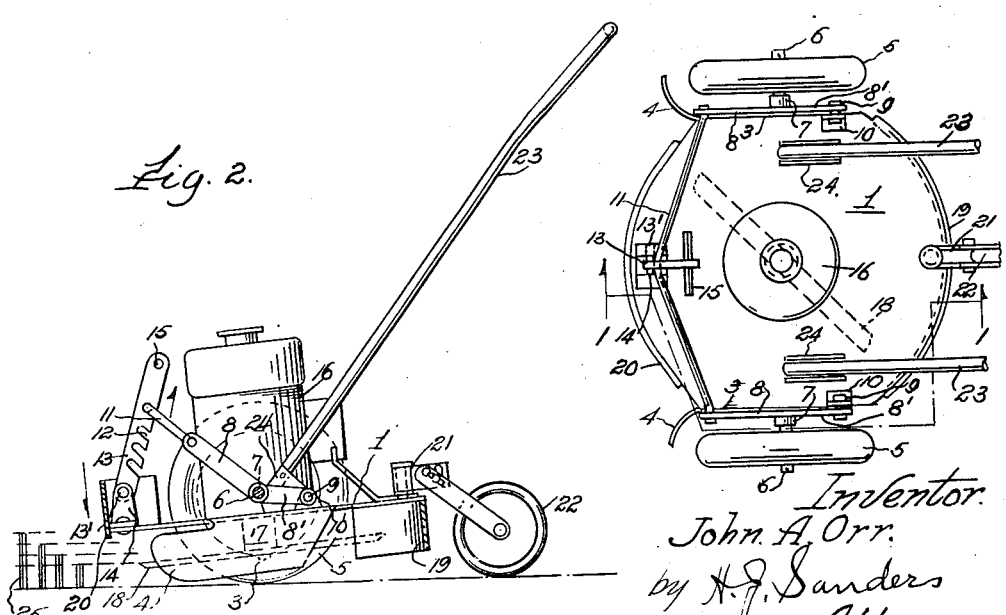
Inventor.
John A. Orr.
by H. J. Sanders
Attorney.

Patented Mar. 9, 1954

2,671,299

UNITED STATES PATENT OFFICE 2,671,299

DISK TYPE MOWER

John A. Orr, Chicago, Ill.

Application September 7, 1951, Serial No. 245,551

2 Claims. (Cl. 56—25.4)

1

This invention relates to improvements in grass cutters and more particularly to power operated mowers of the hand-propelled rotary type for use primarily about the home although capable of use elsewhere. One object is to provide a power mower having novel means for instantly adjusting the cutting element to cut tall or short grass and for securely retaining the said element in adjusted position by gravity.

A further object is to provide a low cost, light weight powerful rotary mower that is absolutely safe in operation, that includes means for moving the grass from the path of the wheels into the path of the blade, that possesses a very high degree of mobility thus making it useful alike over smooth or rough ground, and that assures smooth, even mowing at all times.

In accomplishing the foregoing and other objects of the invention I have provided improved structure, a preferred form of which is illustrated in the accompanying drawing, wherein:

Fig. 1 is a view, mainly side elevational, of a mower constructed in accordance with the invention, one supporting wheel being omitted, the front and rear guards shown in section, the cutting element shown at a high cutting level, the view being taken approximately on the line 1—1 of Fig. 4.

Fig. 2 is a view similar to Fig. 1 but with the cutting element disposed in a position for a closer or lower cut.

Fig. 3 is a front elevational view of the mower with the buffer bar omitted, and, Fig. 4 is a top plan view of the mower with the rear wheel and a portion of the handle omitted.

The instant mower includes a frame having an approximately circular bed plate 1 provided with downturned lateral wings 3 the forward terminals 4 of which are curved outwardly across the path of the frame-supporting side wheels 5, 5 mounted to stub-axles 6 arranged in bearings 7 carried by the obtuse-angled links comprising long and short portions 8, 8', the link portion 8' pivotally supported at its free termination by the pivot pin 9 carried by the lug 10 carried by the said plate 1, the axle 6 disposed at the junction of the link portions 8, 8'.

Connected fast to the free ends of the link portions 8, 8 is the obtuse-angled cross rod 11 extending slightly forwardly of said links for releasable engagement with the parallel notches 12 formed in the rack 13 pivotally supported by the pin 13' of standard 14 at a forward portion of the bed plate in advance of the links 8, 8' at a point approximately midway between said links, the notches in said rack disposed at an angle to

2 its axis, the rack provided at its free end with a handle 15. Arranged upon the bed plate 1 with its weight received in advance of the pivot pins 9 is the engine 16, the drive shaft of which extends through the bed plate and through the bearing housing 17 arranged immediately beneath said plate, said engine shaft at its lower end having fast thereupon the rotary cutter 18.

The said wings 3 terminate slightly above the ground line and serve as side guards for the rotary cutter 18 and are spaced from a rear guard skirt 19 depending from said bed plate, a buffer bar 20 at the forward end of the machine supported by and extending above the bed plate 1 being also provided. Connected at the rear end of the machine adjustably to the plate 1 by bracket 21 is the caster wheel 22, the swivel action of which provides for smooth, even mowing, this wheel being removable, if desired, when mowing over rough ground surfaces. In operation the mower is pushed over the ground by handles 23 secured to lugs 24 secured to the plate 1.

If it is desired to cut the grass 25 at a high level above the ground line the cross rod 11 is disposed in the lowermost notch in the rack 13, as shown in Fig. 1. The angle of the notches 12 to the axis of the rack and the rearward inclination of the rack when engaged by the said rod at a point always rearwardly of the pivot 13', together with the weight of the engine, keeps the rod 11 and rack 13 always positively engaged, the weight of the engine being borne in advance of the pivot pins 9 so that the cutter 18 is releasably locked in adjusted position above the ground line. To place the rod 11 in another notch of the rack, the rack is manually moved away from the rod by means of its handle 15 to free the rod which is then disposed in the rack notch desired thus adjusting the cutter at the desired height.

The pivotal support points 9 for the machine are disposed rearwardly of its center of gravity while the points of possible rack engagement by the rod 11 are all disposed forwardly of the center of gravity and rearwardly of the axis of the pin 13' so that the excess of weight of the machine forwardly of the center of gravity will cause an upward thrust of the rod 11 seating it securely in the engaged notch 12 of the rack 13.

What is claimed is:

1. In a mower, a frame including a circular bed plate, a handle therefor, an engine disposed approximately centrally of said bed plate, a rotary blade fast to the shaft of said engine beneath said bed plate, lugs carried by said bed plate located in a straight line rearwardly of the axis of said engine, a notched rack pivotally carried by said bed plate forwardly of said engine, the notches of said rack disposed at an angle to the rack axis, frame-supporting side wheels, axles for said wheels disposed in a straight line passing through the axis of said engine at right angles to a straight line connecting same and said rack axis, obtuse-angled links fulcrumed to said axles and pivotally connected to said lugs, a cross rod connecting said links for selective engagement with the notches of said rack, and a removable caster wheel for said bed plate.

2. In a mower, a frame including an approximately circular bed plate, an engine disposed approximately centrally of said bed plate, a rotary blade fast to the shaft of said engine beneath said bed plate, lugs carried by said bed plate located in a straight line rearwardly of the axis of said engine, a rack pivotally carried by said bed plate forwardly of said engine, supporting wheels for said bed plate, and means for pivotally connecting said wheels to said lugs and adjustably connecting said wheels to said rack, the points of direct wheel connection disposed in a straight line passing through the engine axis.

JOHN A. ORR.

References Cited in the file of this patent

UNITED STATES PATENTS

| Number | Name | Date |
|---|---|---|
| 2,263,368 | Sejkora | Nov. 18, 1941 |
| 2,568,822 | Pervis | Sept. 25, 1951 |